United States Patent
Zhidkov et al.

(10) Patent No.: US 7,738,603 B2
(45) Date of Patent: Jun. 15, 2010

(54) DECISION FEEDBACK EQUALIZER AND METHOD USED IN DIGITAL TELEVISION RECEIVER

(75) Inventors: Sergey Zhidkov, Suwon-si (KR); Hyun-bae Jeon, Seoul (KR); Taek-won Kwon, Suwon-si (KR); Do-han Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 833 days.

(21) Appl. No.: 11/260,302

(22) Filed: Oct. 28, 2005

(65) Prior Publication Data

US 2006/0120475 A1 Jun. 8, 2006

(30) Foreign Application Priority Data

Dec. 4, 2004 (KR) .................. 10-2004-0101534

(51) Int. Cl.
*H04L 27/06* (2006.01)
(52) U.S. Cl. .............. 375/341; 375/265; 375/262; 375/229; 375/270; 375/232; 348/432.1; 370/280
(58) Field of Classification Search .......... 375/341, 375/233, 232; 348/432.1; 370/280
See application file for complete search history.

(56) References Cited

U.S. PATENT DOCUMENTS

| | | | | |
|---|---|---|---|---|
| 5,010,405 A | * | 4/1991 | Schreiber et al. | 348/432.1 |
| 6,178,209 B1 | * | 1/2001 | Hulyalkar et al. | 375/341 |
| 6,418,164 B1 | * | 7/2002 | Endres et al. | 375/232 |
| 6,734,920 B2 | | 5/2004 | Ghosh et al. | |
| 7,418,034 B2 | * | 8/2008 | Xia et al. | 375/233 |
| 2002/0154248 A1 | | 10/2002 | Wittig et al. | |
| 2009/0109881 A1 | * | 4/2009 | Li et al. | 370/280 |

FOREIGN PATENT DOCUMENTS

| | | |
|---|---|---|
| CN | 1463525 | 12/2003 |
| KR | 10-0323665 | 1/2002 |
| KR | 10-2004-0025516 | 3/2004 |

OTHER PUBLICATIONS

Chinese Office Action dated Jun. 27, 2008.

* cited by examiner

*Primary Examiner*—Sudhanshu C Pathak
(74) *Attorney, Agent, or Firm*—Harness, Dickey & Pierce, P.L.C.

(57) ABSTRACT

A receiver and method for the same are provided. In the receiver, a decoder may decode an equalized signal to generate symbol decisions and a soft information signal. An equalizer may select boundary levels for non-uniform quantization using a soft information signal delayed by a symbol interval. The equalized signal may be generated from a feedback-filtered signal using the symbol decisions.

20 Claims, 9 Drawing Sheets

DECISION FEEDBACK EQUALIZER AND METHOD USED IN DIGITAL TELEVISION RECEIVER

BACKGROUND OF THE INVENTION

This application claims priority under 35 U.S.C. §119 of Korean Patent Application No. 10-2004-0101534, filed on Dec. 4, 2004, in the Korean Intellectual Property Office, the disclosure of which is incorporated herein in its entirety by reference.

1. Field of the Invention

The present invention relates to equalizers, decoders, receivers, and methods for the same.

2. Description of the Conventional Art

Broadcasting systems may utilize OFDM (Orthogonal Frequency Division Multiplexing) based DVB-T (Terrestrial Digital Video Broadcasting) or VSB (Vestigial Sideband Broadcasting), for example, as defined by the ATSC (Advanced Television Subcommittee). A VSB digital television receiver may utilize a more robust receiver capable of receiving a VSB signal including inter-symbol interference through a multi-path channel, more stably demodulating, and/or more stably decoding the received VSB signal.

Figure 1:
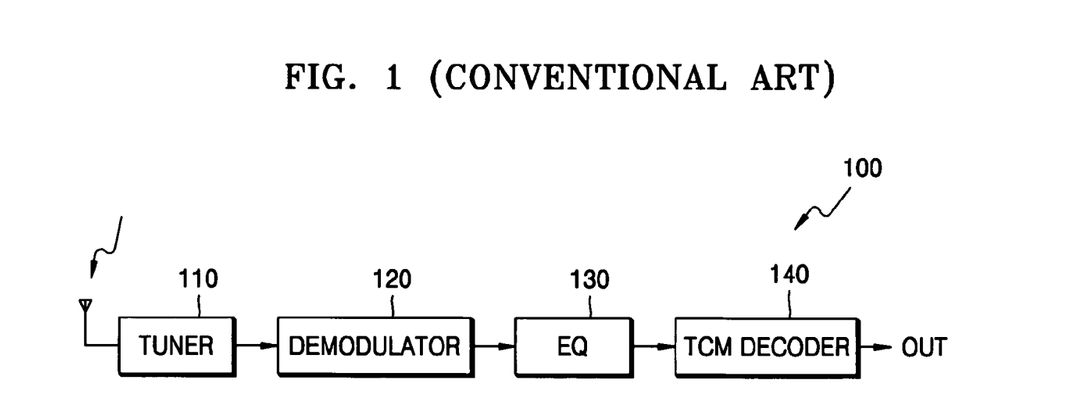
FIG. 1 is a block diagram of a conventional digital television receiver.

FIG. 1 is a block diagram of a conventional digital television receiver 100, which may process a VSB signal. Referring to FIG. 1, the digital television receiver 100 includes a tuner 110, a demodulator 120, an equalizer 130, and a TCM (Trellis-coded Modulation) decoder 140. TCM coding may use an error correction technique, which may improve system robustness against thermal noise. TCM decoding may have more robust performance ability and/or a simpler decoding algorithm. The output signal OUT of the TCM decoder 140 may be processed by a signal processor and output as multimedia signals (e.g., display signals and/or audio signals).

Figure 2:
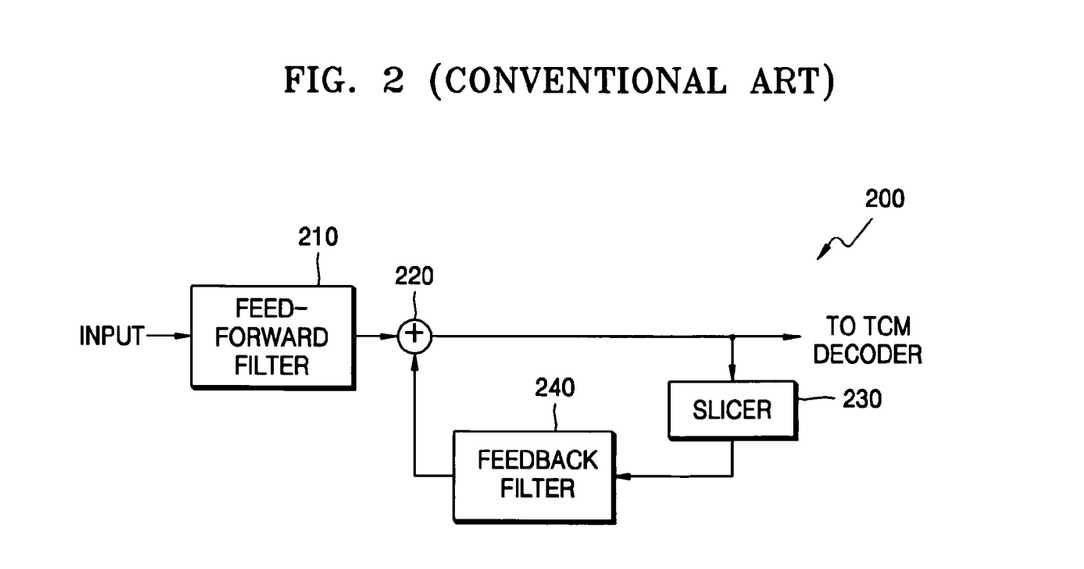
FIG. 2 is a block diagram of a conventional decision-feedback-equalizer (DFE)

FIG. 2 illustrates an example of a conventional decision-feedback equalizer (DFE) 200, which may be used as the equalizer 130 of FIG. 1. Referring to FIG. 2, the DFE 200 includes a feed-forward filter 210, an adder 220, a slicer 230, and a feedback filter 240. The DFE 200 may receive the output signal of the demodulator 110 of FIG. 1 as an input signal INPUT, equalize distortion of the received signal and output the equalized signal to the TCM decoder 140 of FIG. 1. The DFE 200 may be positioned, for example, prior to the TCM decoder and may use uncoded symbols to perform a feedback process. However, the uncoded symbols may have lower reliability.

Figure 3:
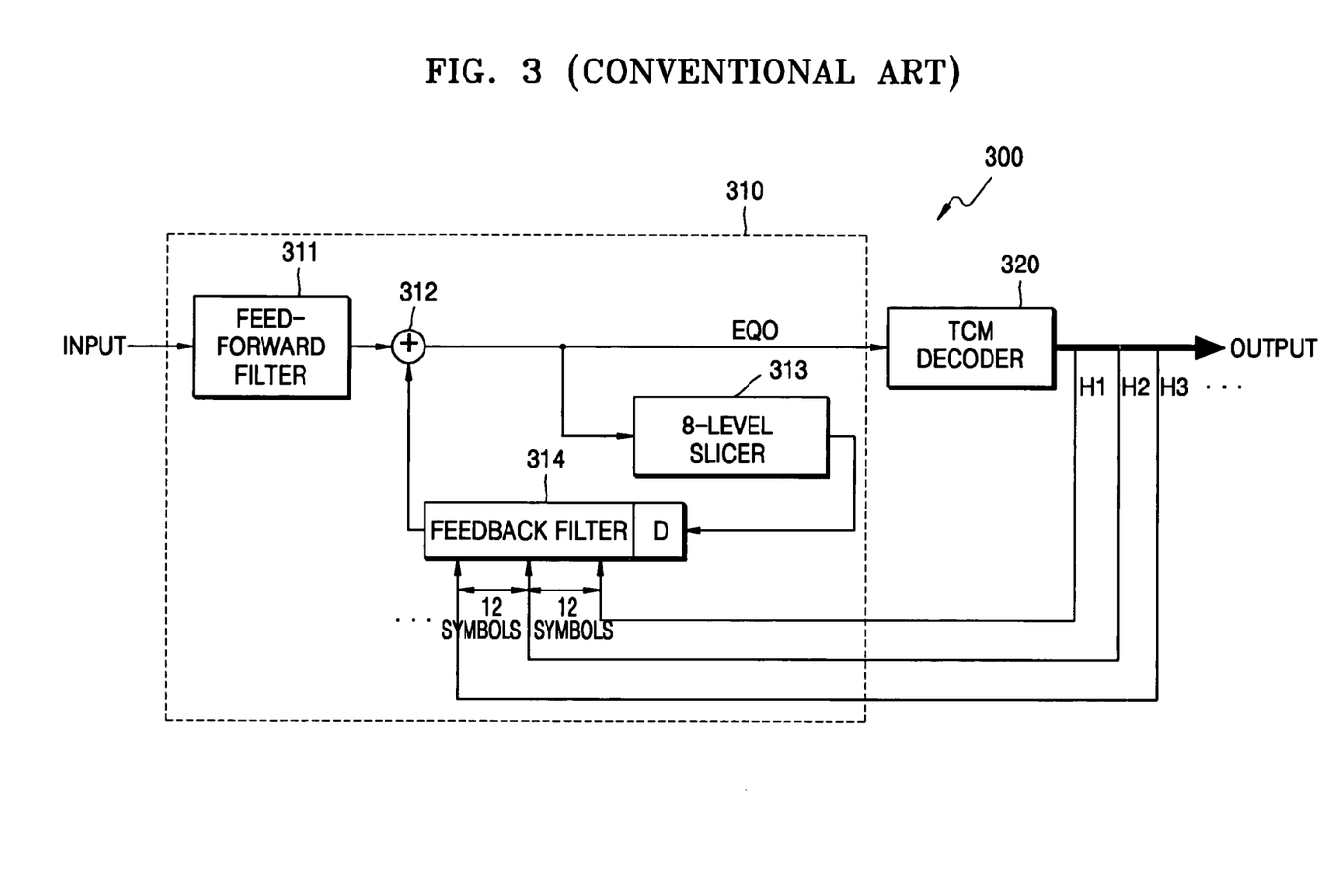
FIG. 3 is a block diagram of another conventional decision-feedback-equalizer DFE.

FIG. 3 illustrates a conventional digital television receiver 300 having a DFE 310 combined with a TCM decoder 320. Referring to FIG. 3, the DFE 310 may include a feed-forward filter 311, an adder 312, a slicer 313, and a feedback filter 314. The TCM decoder 320 may decode the output signal EQO of the DFE 310, and may generate symbol decisions H1, H2, H3, ..., using a branch metric computation and traceback procedure that may be the reverse of the TCM encoding process. The symbol decisions H1, H2, H3, ..., which may be fed back to the feedback filter 314, may have higher reliability because they may be generated from a more (e.g., the most) probable surviving path.

However, the TCM decoder 320 generating the symbol decisions H1, H2, H3, ..., may utilize a higher system clock rate to operate with suppressed (e.g., without) delay, which may increase hardware complexity and/or power consumption. In the alternative, a more hardware efficient TCM decoder 320 may introduce delays in the decoding process. For example, the first available decision from TCM decoder 320 (H1) may be delayed by D symbols, where D may be, for example, 2 to 7 symbols. To suppress performance degradation, a first D taps of the feedback filter 314 may be filled with decisions produced by the slicer 313. The remaining taps may be filled with the symbol decisions H1, H2, H3, ... produced by TCM decoder 320.

Figure 4:
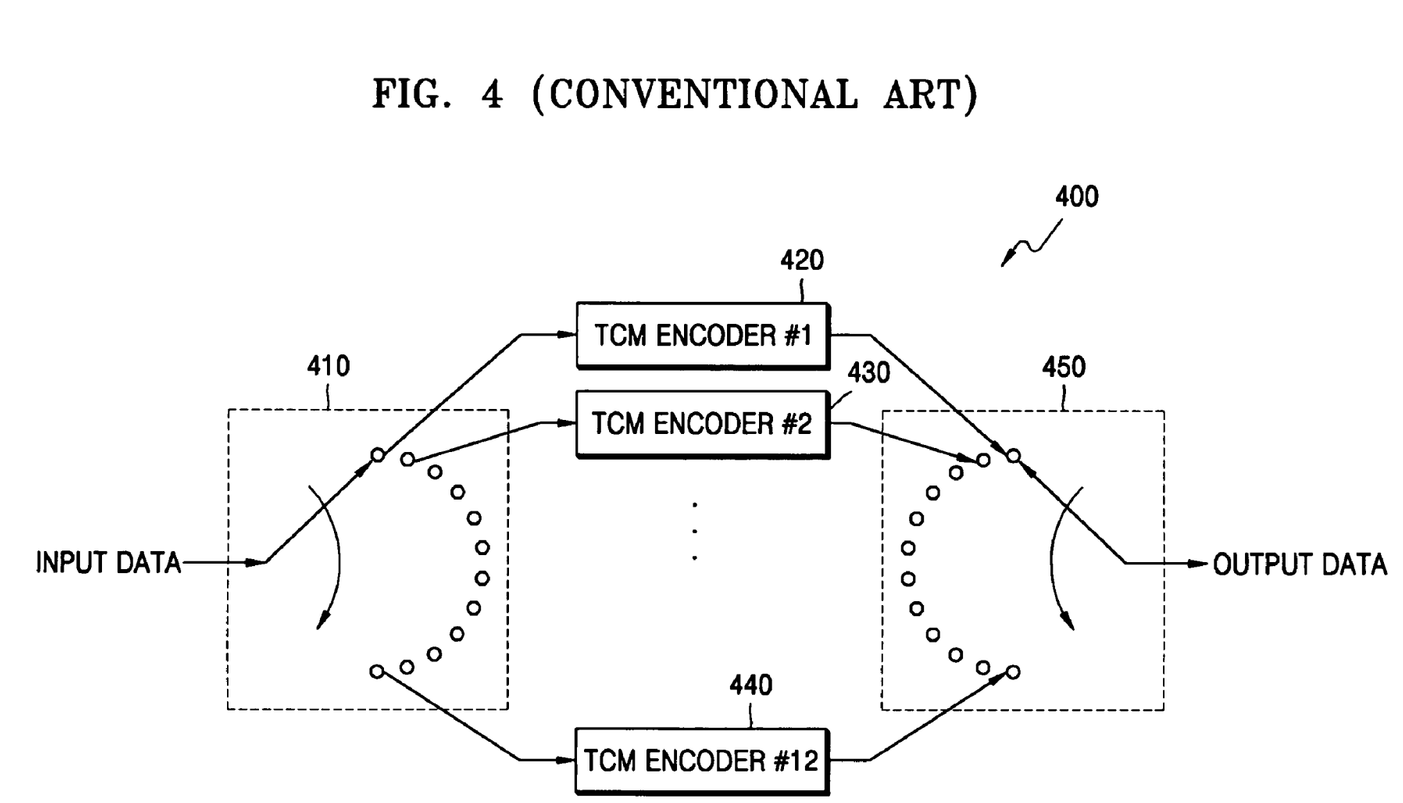
FIG. 4 is a block diagram of a conventional trellis coded modulation (TCM) encoding device.

A transmitting device transmitting a VSB signal may include a TCM encoder 400 shown in FIG. 4. Referring to FIG. 4, the TCM encoding device 400 used in a broadcasting system (e.g., an ATSC broadcasting system) includes a first switch 410, twelve parallel TCM encoders 420, 430 and 440, and a second switch 450. The first TCM encoder 420 may TCM-encode a first symbol group of input data, for example, the first, thirteenth and twenty-fifth symbols. The second TCM encoder 430 may TCM-encode a second symbol group of the input data, for example, the second, fourteenth and twenty-sixth symbols. The twelfth TCM encoder 440 may TCM-encode a twelfth symbol group of the input data, for example, the twelfth, twenty-fourth and thirty-sixth symbols. This code interleaving operation of the TCM encoding device 400 may generate a twelve symbol interval between output data items.

Figure 5:
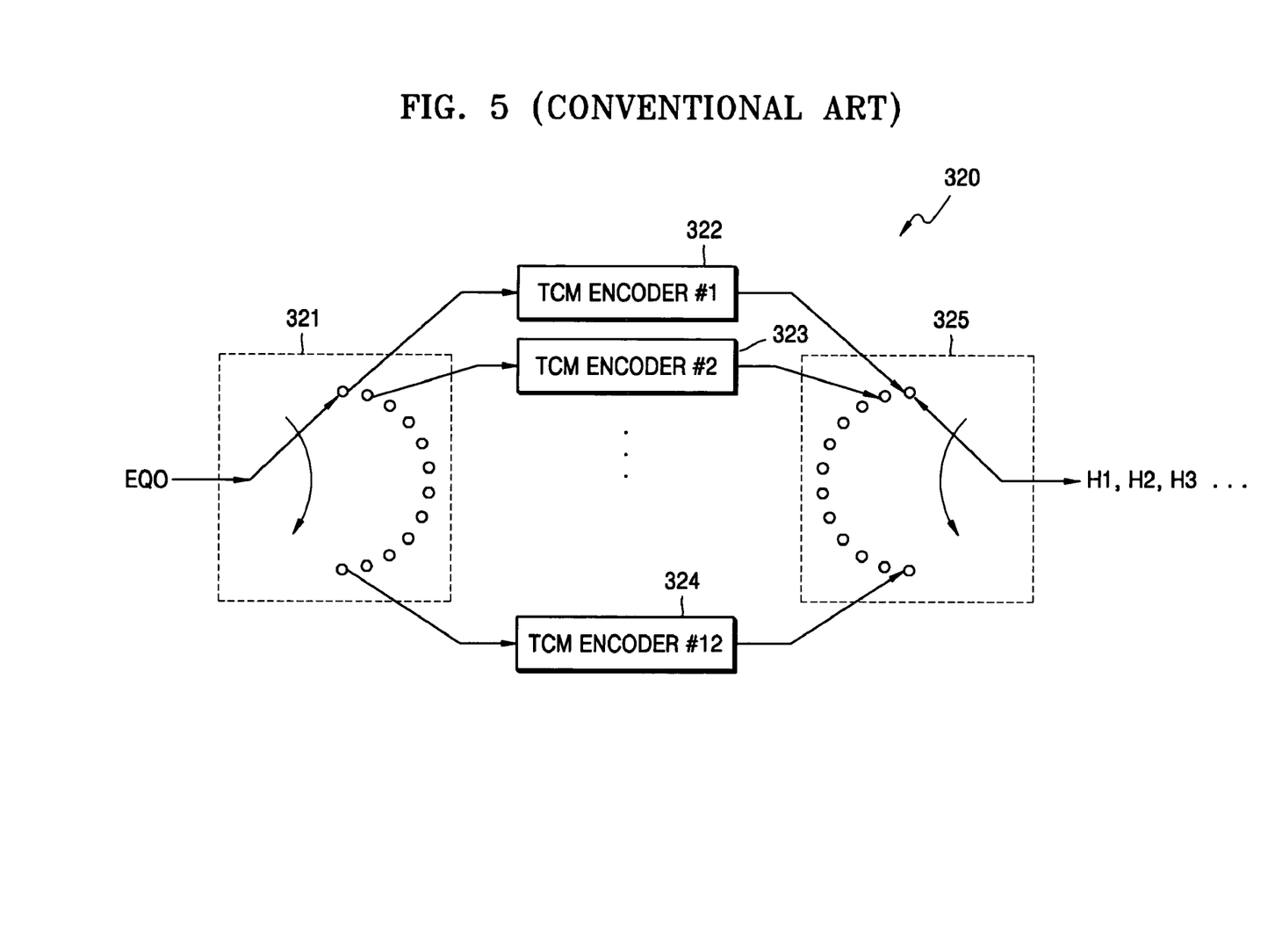
FIG. 5 is a block diagram of a conventional trellis coded modulation TCM decoding device.

The TCM decoder 320 of FIG. 3 may have the same, or substantially the same, configuration as illustrated in FIG. 5. Referring to FIG. 5, the TCM decoder 320 used in the broadcasting system includes a first switch 321, twelve parallel TCM decoders 322, 323 and 324, and a second switch 325. The TCM decoders 322, 323 and 324 may each perform the branch metric computation and traceback procedure to generate symbol decisions H1, H2, H3, ..., from a more (e.g., the most) probable surviving path. There may be a twelve symbol interval between adjacent symbol decisions.

SUMMARY OF THE INVENTION

Example embodiments of the present invention provide methods and apparatuses for receiving, decoding, and/or equalizing a signal.

In an example embodiment of the present invention, a receiver may include a decoder and an equalizer. The decoder may be adapted to decode an equalized signal and generate symbol decisions and a soft information signal. The equalizer my be adapted to quantize the equalized signal in response to boundary levels selected using the soft information signal, filter the quantized signal using the symbol decisions, and add the filtered signal and a filtered input signal to generate the equalized signal.

Another example embodiment of the present invention provides a method for equalizing an input signal. The method may include decoding an equalized signal to generate symbol decisions and a soft information signal, and equalizing a filtered input signal based on symbol decisions and the generated soft information signal based on the equalized signal.

In example embodiments of the present invention, a method may further include quantizing the equalized signal in response to boundary levels selected using the soft information signal. The equalizing of the input signal may further include filtering the quantized signal using the symbol decisions, and adding the filtered quantized signal and a filtered input signal to generate the equalized signal.

Another example embodiment of the present invention provides a decoder, which may be adapted to decode an equalized signal and generate symbol decisions and a soft information signal, which may be fed back to an equalizer for use in equalizing an input signal.

Another example embodiment of the present invention provides an equalizer, which may be adapted to quantize an equalized signal in response to boundary levels selected using a soft information signal, filter the quantized signal using symbol decisions, and add the filtered signal and a filtered input signal to generate the equalized signal.

Another example embodiment of the present invention provides a method for quantizing a signal. The method may include storing a plurality of decision boundary sets including at least one non-uniform boundary set, selecting a decision boundary set based on a soft information signal, and determining a quantization value based on the selected decision boundary set.

In example embodiments of the present invention, the decoder may perform trellis-coded modulation (TCM) decoding.

In example embodiments of the present invention, the symbol decisions may be decided from a sequence of the most probable surviving path having the smallest path metric value among a plurality of surviving paths.

In example embodiments of the present invention, the soft information signal may be a signal indicating whether a next value of a received vestigial side-band (VSB) signal is close to a first data subset or a second data subset.

In example embodiments of the present invention, the first subset includes levels −7, −3, +1 and +5 among eight levels and the second data subset including levels −5, −1, +3 and +7 among the eight levels.

In example embodiments of the present invention, the decoder may further include a plurality of decoders, a first selector, and a second selector. The plurality of decoders may be adapted to decode respective symbols having equal symbol intervals from the equalized signal and generate respective decisions and additional information signals. The first selector may sequentially select the additional information signals generated by respective decoders and outputting a selected additional information signal as the soft information signal. The second selector may sequentially select the decisions generated by the respective decoders and outputting selected decisions as the symbol decisions.

In example embodiments of the present invention, adjacent decisions may have an interval of a plurality of symbols there between.

In example embodiments of the present invention, an equalizer may further include a first filter, an adder, a level selector, a quantizer, and a second filter. The first filter may be adapted to filter the input signal. The adder may be adapted to add the filtered input signal and the filtered signal and output the sum as the equalized signal. The level selector adapted to store a plurality of decision boundary sets including a decision boundary set having a non-uniform boundary interval, select a decision boundary set in response to the soft information signal, and output the boundary levels included in the selected decision boundary set. The quantizer may be adapted to determine a quantization value of the equalized signal in response to the boundary levels output from the level selector to generate the quantized signal. The second filter may be adapted to filter the quantized signal using the symbol decisions and output the filtered quantized signal.

In example embodiments of the present invention, an equalizer may further include a delay delaying the soft information signal by a symbol interval corresponding to a multiple of D, wherein D may be a quantity of delay of the decoder. The second filter may delay the quantized signal by D and filter the delayed quantized signal.

In example embodiments of the present invention, the symbol decisions may be decided from a sequence of, for example, the most probable surviving path having, for example, the smallest path metric value among a plurality of surviving paths.

In example embodiments of the present invention, respective symbols having equal symbol intervals from the equalized signal may be trellis-coded modulation (TCM) decoded to generate respective decisions and additional information signals. Additional generated information signals may be sequentially selected, and a selected additional information signal may be output as the soft information signal. Respective decisions may also be sequentially selected and output as symbol decisions.

In example embodiments of the present invention, the boundary levels belong to one of the plurality of decision boundary sets including the decision boundary set having a non-uniform boundary interval, which is selected using the soft information signal.

BRIEF DESCRIPTION OF THE DRAWINGS

Example embodiments of the present invention will become more apparent by describing in detail example embodiments thereof with reference to the attached drawings in which.

DETAILED DESCRIPTION OF THE EXAMPLE EMBODIMENTS OF THE PRESENT INVENTION

Example embodiments of the present invention will now be described more fully with reference to the accompanying drawings, in which example embodiments of the invention are shown. These example embodiments are provided so that this disclosure will be thorough and complete, and will fully convey the concept of the present invention to those skilled in the art. Throughout the drawings, like reference numerals refer to like elements.

Figure 6:
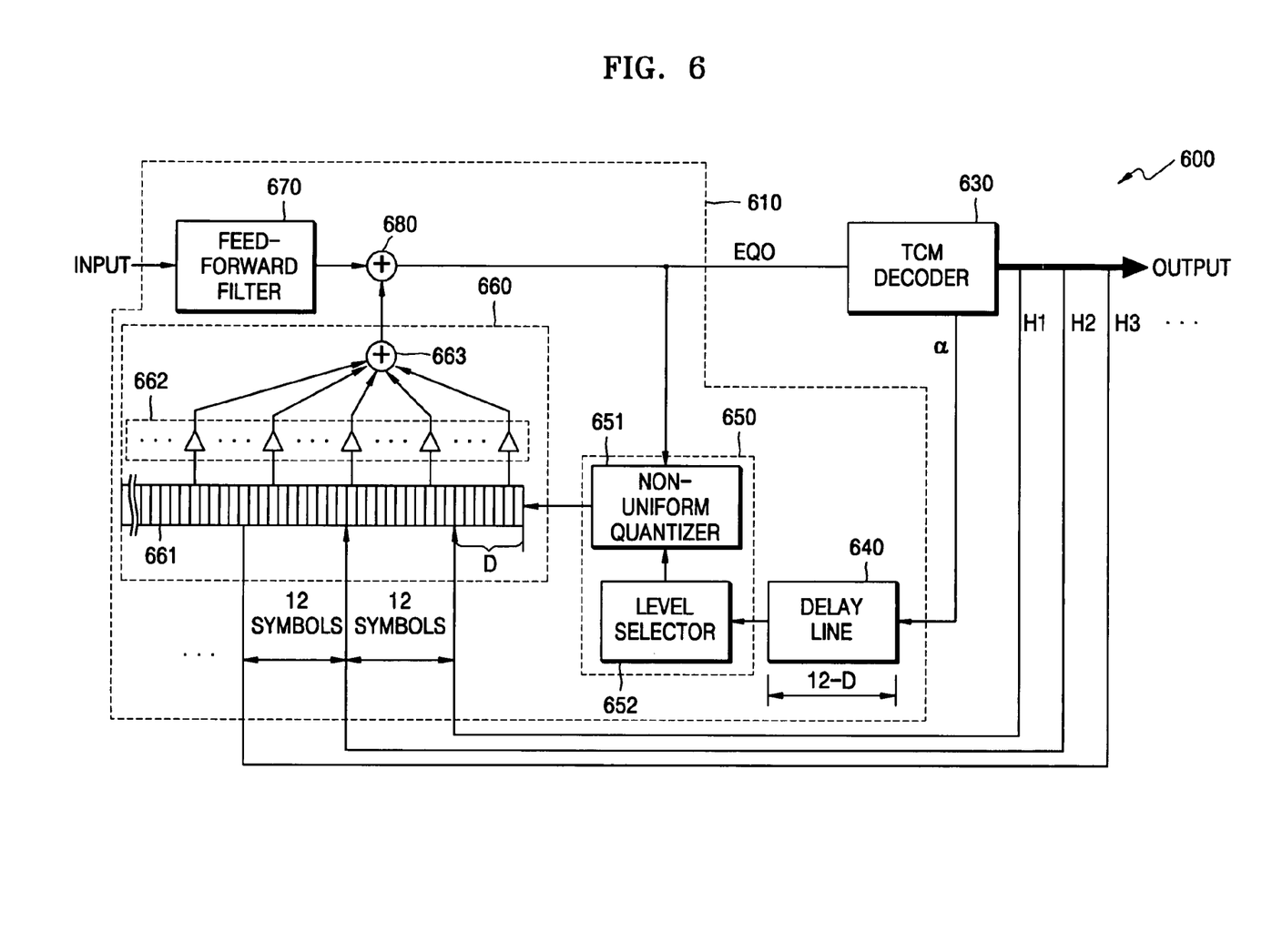
FIG. 6 is a block diagram of a receiver, according to an example embodiment of the present invention.

FIG. 6 is a block diagram of a receiver (e.g., a digital television receiver) 600, according to an example embodiment of the present invention. Referring to FIG. 6, the receiver 600 may include an equalizer (e.g., a decision-feedback-equalizer (DFE)) 610 and a decoder (e.g., a trellis coded modulation (TCM) decoder) 630. An example operation of the receiver 600, according to an example embodiment of the present invention, will be explained with reference to the flow chart of FIG. 11.

The equalizer 610 may equalize an input signal INPUT. The input signal INPUT may be a signal output, for example, from the demodulator 120 of FIG. 1. A feed-forward filter 670 included in the equalizer 610 may filter the input signal INPUT according to, for example, a conventional finite impulse response (FIR) filtering method (e.g., S110 of FIG. 11). An adder 680 included in the equalizer 610 may add the filtered signal, output from the feed-forward filter 670, and a filtered signal, output from a feedback filter 660, and may output an equalized signal EQO (e.g., S120 of FIG. 11). A delay line 640 and a slicer 650 included in the equalizer 610 will be explained in more detail below.

The decoder 630 may decode (e.g., TCM-decode) the equalized signal EQO output from the equalizer 610 according to, for example, the ATSC standard. Decoding (e.g., TCM decoding) may carry out a branch metric computation and traceback procedure for a reverse procedure of encoding (e.g., TCM encoding), which may be performed by a transmitter.

Figure 7:
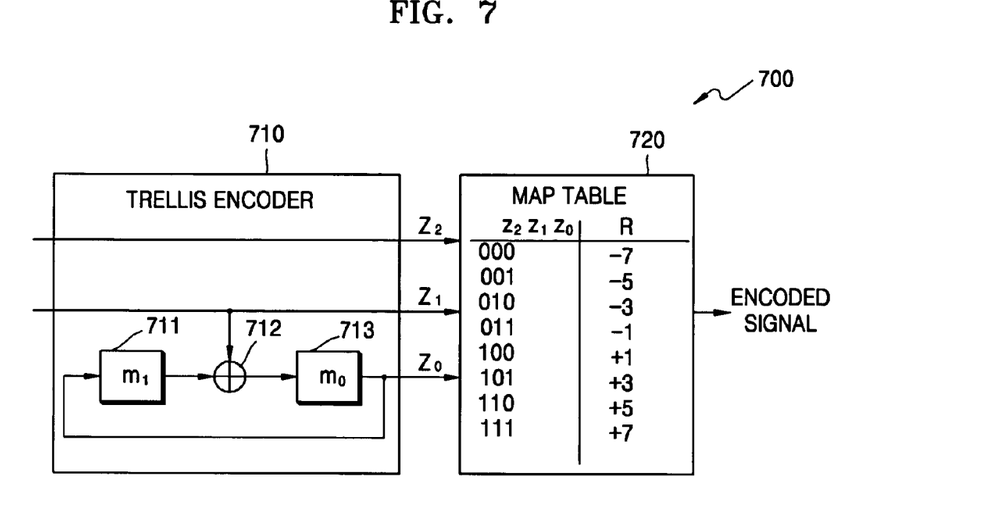
FIG. 7 is an example diagram illustrating an encoding algorithm, according to an example embodiment of the present invention.

Referring to FIG. 7, the TCM encoder 700 may include an encoder (e.g., trellis encoder) 710 and a mapper 720. The encoder 710 may add a bit Z0 to bit data Z2 and Z1 to be transmitted using, for example, a first bit-memory 711, an adder 712 and a second bit-memory 713. The mapper 720 may map eight values of the data Z2, Z1 and Z0 to −7, −5, −3, −1, +1, +3, +5 and +7 and may output the mapped values as, for example, an encoded 8-level VSB signal. The 8-level VSB signal may be encoded by the transmitter and combined with a carrier to be transmitted.

Figure 11:
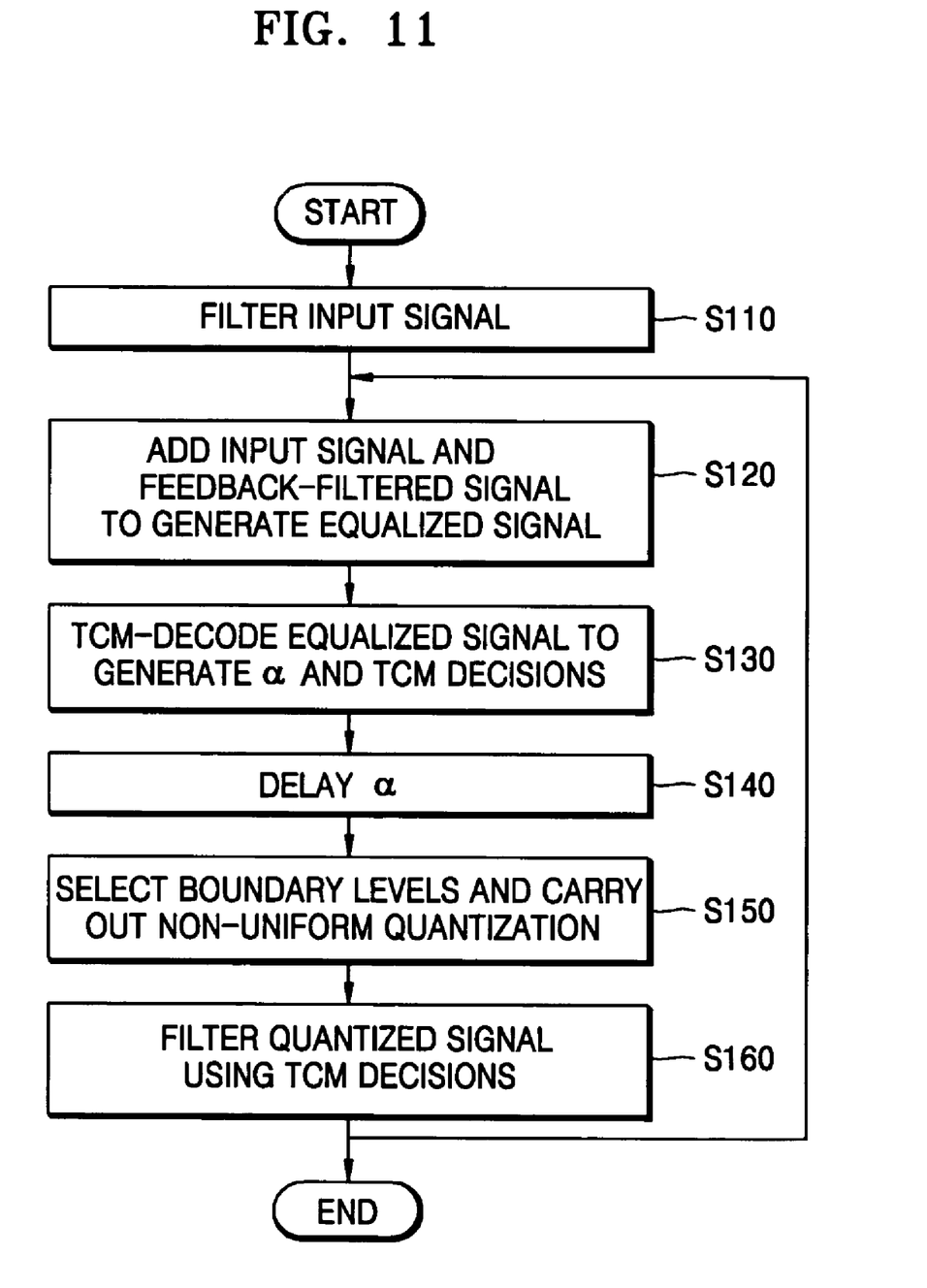
FIG. 11 is a flow chart illustrating a receiving method, according to an example embodiment of the present invention.

The decoder 630 may generate symbol decisions H1, H2, H3, . . . , and a soft information signal α through the decoding process of the equalized signal EQO (S130 of FIG. 11). The symbol decisions H1, H2, H3, . . . , output from the decoder 630 may be determined from a sequence of a more (e.g., the most) probable surviving path having a smaller (e.g., the smallest) path metric value among, for example, four surviving paths.

The soft information signal α may indicate whether the next value of a received VSB signal is closer to a first data subset (e.g., corresponding to levels −7, −3, +1 and +5 among the eight levels) or a second data subset (e.g., corresponding to levels −5, −1, +3 and +7 among the eight levels). The soft information signal α may be represented, for example, by Equation 1.

[Equation 1]

$$\alpha = \left(\frac{1}{PM_{00}} + \frac{1}{PM_{10}}\right) - \left(\frac{1}{PM_{01}} + \frac{1}{PM_{11}}\right)$$

$PM_{00}$ may be a path metric value of a path through which the equalized signal EQO may be merged into a state 00, and $PM_{10}$ may be a path metric value of a path through which the equalized signal EQO may be merged into a state 10. $PM_{01}$ may be a path metric value of a path through which the equalized signal EQO may be merged into a state 01, and $PM_{11}$ may be a path metric value of a path through which the equalized signal EQO may be merged into a state 11. These path metric values may be obtained, for example, using conventional branch metric computation procedures.

The soft information signal α generated by the decoder 630 may predict the next state of the equalized signal and may indicate the predicted next state in advance. The predicted next state may be used in the equalizer 610 to improve decision reliability in the next symbol interval.

Figure 8:
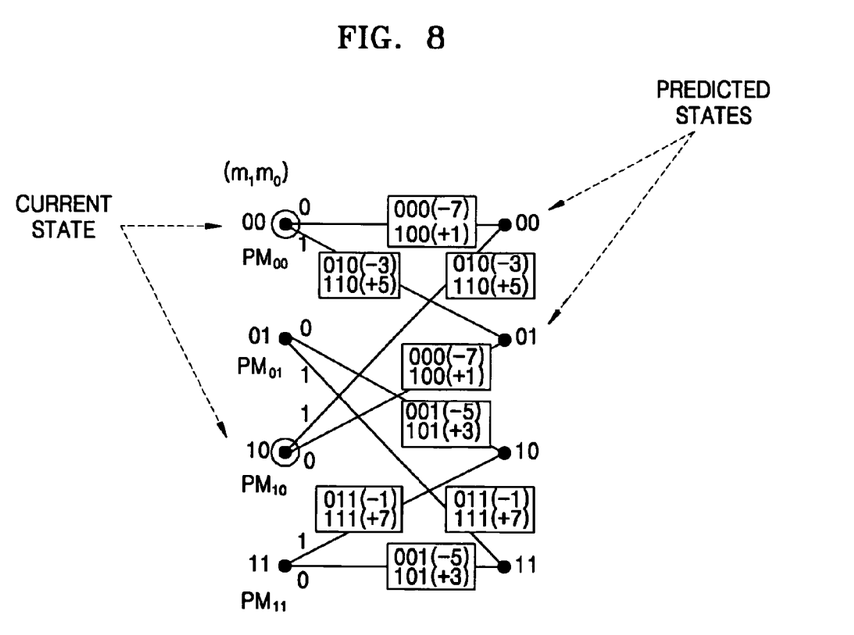
FIG. 8 is a trellis diagram illustrating an example of the prediction of a next state from the current state in a TCM decoding process, according to an example embodiment of the present invention.

FIG. 8 is a trellis diagram illustrating the prediction of a next state using the current state, for example, in a decoding process (e.g., a TCM decoding process). Referring to FIG. 8, a decoder (e.g., 630 of FIG. 6) may select, for example, four surviving paths merged into all, or substantially all, the probable encoder states 00, 01, 10 and 11, respectively, during a decoding process. These paths may have corresponding path metric values $PM_{00}$, $PM_{10}$, $PM_{01}$ and $PM_{11}$, respectively.

If the current states of the bit-memories 711 and 713 of the encoder (e.g., TCM encoder) 700 of FIG. 7 are 00 or 10 and the next bit data items Z2 and Z1 are 0 or 1, the next encoder state may be 00 or 01 and there may be a higher probability that the next symbol belongs to the first data subset including −7, −3, +1 and +5 among the eight levels. If the current state of the TCM encoder is 01 or 11, the next encoder state may be 10 or 11 and there may be a higher probability that the next symbol belongs to the second data subset including −5, −1, +3 and +7 among the eight levels.

The next symbol value may be closer to one of constellation points −7, −3, +1 and +5 or one of constellation points −5, −1, +3 and +7, and the soft information signal α may be used to determine which of the values are closer. The soft information signal α may be generated more easily using Equation 2. However, the soft information signal α may also be generated more easily using other equations.

$$\alpha = \min(PM_{01}, PM_{11}) - \min(PM_{00}, PM_{10})$$ [Equation 2]

min( ) may indicate a minimum value of elements. In Equation 1 or Equation 2, when α>>0, the path metric value $PM_{00}$ and/or $PM_{10}$ may be less, or substantially less, than $PM_{01}$ and/or $PM_{11}$, the next encoder state may be 00 or 01, and there may be a higher probability that the next symbol value belongs to the first data subset including −7, −3, +1 and +5. The path having the smaller path metric value may be assumed to be the more probable surviving path. When α<<0, there may be a higher probability that the next symbol value belongs to the second data subset including −5, −1, +3 and +7. When α=0, there may be an equal, or substantially equal, probability that the next symbol value belongs to the each of the eight levels −7, −5, −3, −1, +1, +3, +5, +7. The level to which the next symbol value belongs may be predicted based on the value of the soft information signal α. The soft information signal α may be used for the basis of decisions in the slicer 650, for example, in cases other than the aforementioned three cases.

Figure 10:
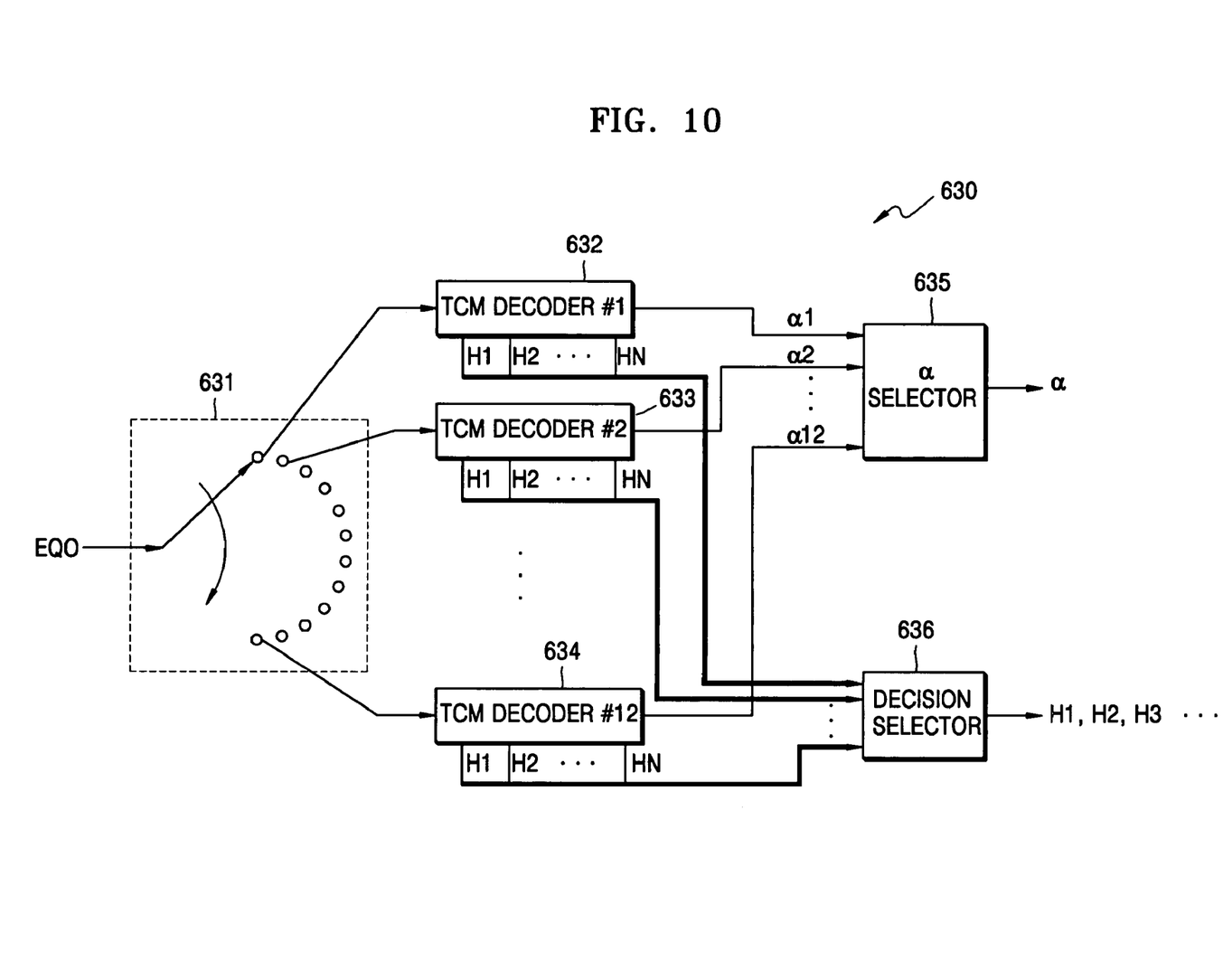
FIG. 10 is a block diagram illustrating a decoder, according to an example embodiment of the present invention.

FIG. 10 is a block diagram of a decoder (e.g., a TCM decoder), according to an example embodiment of the present invention, which may generate the symbol decisions H1, H2, H3, . . . , and the soft information signal α. The decoder may generate the symbol decisions H1, H2, H3, . . . and the soft information signal α, for example, by executing a decoding process on the equalized signal. Referring to FIG. 10, the decoder (e.g., TCM decoder) 630 includes an input switch 631, twelve decoders (e.g., TCM decoders) 632, 633 and 634, a soft decision information signal α selector 635, and a decision selector 636.

The input switch 631 may receive the equalized signal EQO output from the equalizer 610 and may distribute (e.g., sequentially distribute) symbol streams to, for example, the twelve decoders. The twelve decoders 632, 633 and 634 may decode (e.g., TCM decode) symbols of the equalized signal EQO, which have twelve symbol intervals, to generate decisions H1, H2, . . . , HN and additional information signals α1, α2, . . . , α12 (S130 of FIG. 11). For example, the first decoder (e.g., TCM decoder) 632 may decode (e.g., TCM-decode) a first symbol group, including the first, thirteenth and twenty-fifth symbols, and may generate a first additional information signal α1 using, for example, Equation 1 or Equation 2.

In another example, the second decoder (e.g., TCM decoder) 633 may decode (e.g., TCM-decode) a second symbol group, including the second, fourteenth and twenty-sixth symbols, and may generate a second additional information signal α2. The twelfth decoder (e.g., TCM decoder) 634 may decode (e.g., TCM-decode) a twelfth symbol group, including the twelfth, twenty-fourth and thirty-sixth symbols, and may generate a twelfth additional information signal α12.

The soft decision information signal α selector 635 may select (e.g., sequentially select) the additional information signals α1, α2, α12, generated by the decoders 632, 633 and 634, and may output a selected additional information signal as the soft information signal α. The decision selector 636 may select (e.g., sequentially select) the decisions H1, H2, . . . , HN generated by the decoders 632, 633 and 634 and may output the selected decisions as the symbol decisions H1, H2, H3, . . . . This code interleaving performed by the decoders 632, 633 and 63 may generate an interval of twelve symbols between adjacent symbol decisions H1, H2, H3.

Back to FIG. 6, the equalizer 610 may include the feed-forward filter 670, the adder 680, the delay line 640, the slicer 650, and the feedback filter 660. The feed-forward filter 670 may filter (e.g., feed-forward-filter) the demodulated input signal INPUT using, for example, a conventional FIR filtering method. For example, the feed-forward filter 670 may multiply the same, or substantially the same, number of delayed signals as the number of taps, which may be generated by delaying the input signal INPUT, for example, by filter coefficients and may add the multiplied values. This FIR filtering method may also be applied to the feedback filter 660. The adder 680 may add the filtered signal output from the feed-forward filter 670 and the filtered signal output from the feedback filter 660 and may output the equalized signal of the equalizer 610.

The delay line 640 may delay the soft information signal α generated by the decoder 630 by a symbol interval of 12-D (S140 of FIG. 11). D may represent the quantity of delay generated during a branch metric computation and traceback procedure of the decoders 632, 633 and 634 of the decoder 630. D may be less, or substantially less, than the twelve symbol interval.

Figure 9:
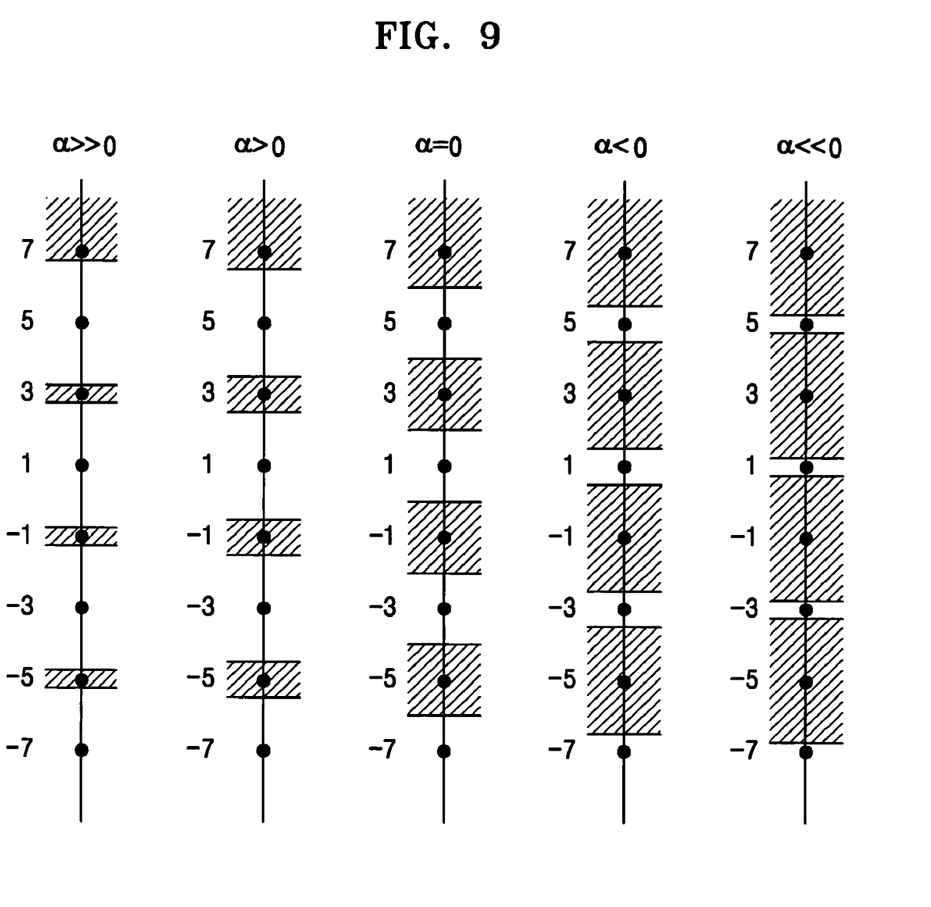
FIG. 9 is a diagram illustrating a quantization method, according to an example embodiment of the present invention.

The slicer 650 may include a level selector 652 and a non-uniform quantizer 651. The level selector 652 may be similar, or substantially similar, to, for example, a ROM (Read Only Memory), or any other suitable memory device. The level selector 652 may store a plurality of decision boundary sets including, for example, a decision boundary set having a non-uniform boundary interval. The level selector 652 may select a decision boundary set in response to the soft information signal α generated by the decoder 630, and may output boundary levels included in the selected decision boundary set. The number of decision boundary sets may be, for example, five as shown in FIG. 9. The non-uniform quantizer 651 may decide a quantization value of the equalized signal in response to the boundary levels included in the decision boundary set selected by the level selector 652 to generate a quantized signal (S150 of FIG. 11).

Referring to FIG. 9, when α>0, regions including the levels −7, −3, +1 and +5 among the boundary levels included in the decision boundary set may be widened, and regions including the levels −5, −1, +1 and +7 may be narrowed. When α>>0, the regions including the levels −5, −1, +3 and +7 may become narrower and the slicer 650 may be operated as, for example, a 4-level slicer, which may have the levels −7, −3, +1 and +5. When α=0, the regions including levels −7, −5, −3, −1, +1, +3, +5 and +7 may have an equal, or substantially equal, distance so that the slicer 650 may be operated, for example, as an 8-level slicer. When α<0, the regions including the levels −5, −1, +3 and +7 may be widened, and the regions including the levels −7, −3, +1 and +5 may be narrowed. When α<<0, the regions corresponding to the levels −7, −3, +1 and +5 may become narrower and the slicer 650 may be operated as a 4-level slicer, which may have the levels −5, −1, +3 and +7. The five decision boundary sets may be stored in the level selector 652. In example embodiments of the present invention, greater than five decision boundary sets may be included in the level selector 652.

The feedback filter 660 may filter (e.g., feedback-filter) the quantized signal output from the slicer 650, for example, according to a conventional FIR filtering method. The feedback filter 660 includes a plurality of delay units 661, multipliers 662, and an adder 663. The plurality of delay units 661 may generate a number of delayed signals corresponding to the number of taps from the quantized signal output from the slicer 650 and the symbol decisions H1, H2, H3 . . . output from the decoder 630. The quantized signal may be delayed by the delay D of the decoder 630, for example, according to the delay units 661 to be reflected on the generation of the delayed signals of the delay units 661. The multipliers 662 may multiply the delayed signals output from the plurality of delay units 661 by filter coefficients. The adder 663 may add the multiplied values and may output a filtered (e.g., feedback-filtered) signal (S160 of FIG. 11).

The equalizer 610 may quantize the equalized signal EQO in response to the boundary levels selected using the soft information signal α. The equalizer 610 may filter (e.g., feedback-filter) the quantized signal using the symbol decisions H1, H2, H3 . . . . The filtered (e.g., feedback-filtered) signal and the filtered (e.g., feed-forward-filtered) input signal INPUT may be added to generate the equalized signal EQO.

In the receiver (e.g., digital television receiver) 600, according to example embodiments of the present invention, the decoder (e.g., TCM decoder) 630 may decode the equalized signal EQO to generate the symbol decisions H1, H2, H3 . . . and the soft information signal α. The equalizer 610 may select boundary levels for quantization (e.g., non-uniform quantization) using the soft information signal delayed by a symbol interval of 12-D and may generate the equalized signal EQO from the feedback-filtered signal, for example, using the symbol decisions H1, H2, H3.

Example embodiments of the present invention may use an equalizer (e.g., a decision-feedback-equalizer), which may have improved decision reliability using, for example, additional soft information signal. The improved decision reliability may provide a receiver (e.g., a digital television receiver), according to example embodiments of the present invention, with improved performance, for example, in delay channel environments.

Example embodiments of the present invention have been described with regard to digital television receivers, TCM decoders, ATSC standards, etc. However, it will be understood that example embodiments of the present invention may be applied in any suitable digital receiver, for example, a digital audio receiver. Further, it will also be understood that any suitable decoder for decoding a signal according to any suitable standard, for example, National Television System Committee (NTSC) standard.

While example embodiments of the present invention have been shown and described with reference to example embodiments thereof, it will be understood by those of ordinary skill in the art that various changes in form and details may be made therein without departing from the spirit and scope of the present invention as defined by the following claims.

What is claimed is:

1. A receiver, comprising:
    a decoder configured to decode a plurality of symbols, symbol decisions, and additional information signals from an equalized signal, sequentially select one of the additional information signals, and output a selected additional information signal as a soft information signal; and
    an equalizer configured to quantize the equalized signal in response to uniform and non-uniform boundary levels selected using the soft information signal, filter the quantized signal using the symbol decisions, and add the filtered quantized signal and a filtered input signal to generate the equalized signal;
    wherein the soft information signal is represented by:

$$\alpha = (1/PM_{00} + 1/PM_{10}) - (1/PM_{01} + 1/PM_{11})$$

wherein $\alpha$ is the soft information signal,
    wherein $PM_{00}$ is a path metric value of a path through which the equalized signal may be merged into a state 00,
    wherein $PM_{01}$ is a path metric value of a path through which the equalized signal may be merged into a state 01,
    wherein $PM_{10}$ is a path metric value of a path through which the equalized signal may be merged into a state 10, and
    wherein $PM_{11}$ is a path metric value of a path through which the equalized signal may be merged into a state 11.

2. The receiver of claim 1, wherein the decoder is configured to perform trellis-coded modulation (TCM) decoding.

3. The receiver of claim 1, wherein the symbol decisions are decided from a sequence of a most probable surviving path having a smallest path metric value among a plurality surviving paths.

4. The receiver of claim 1, wherein the soft information signal indicates whether a next value of a received vestigial side-band (VSB) signal is closer to a first data subset or a second data subset.

5. The receiver of claim 4, wherein the first subset includes levels −7, −3, +1 and +5 and among eight levels, and
    wherein the second data subset includes levels −5, −1, +3 and +7 among the eight levels.

6. The receiver of claim 1, wherein the decoder includes:
    a plurality of decoders configured to decode respective symbols having equal symbol intervals from the equalized signal, and generate respective decisions and the additional information signals;
    a first selector configured to sequentially select the additional information signals generated by respective decoders, and output the selected additional information signal as the soft information signal; and
    a second selector configured to sequentially select the decisions generated by the respective decoders, and output selected decisions as the symbol decisions.

7. The receiver of claim 6, wherein adjacent decisions have an interval of the plurality of symbols between the adjacent decisions.

8. The receiver of claim 1, wherein the equalizer includes:
    a first filter configured to filter an input signal;
    an adder configured to add the filtered input signal and the filtered quantized signal, and output the sum as the equalized signal;
    a level selector configured to store a plurality of decision boundary sets including the boundary levels, select one of the plurality of decision boundary sets in response to the soft information signal, and output the boundary levels included in the selected decision boundary set;
    a quantizer configured to determine a quantization value of the equalized signal in response to the boundary levels output from the level selector to generate the quantized signal; and
    a second filter configured to filter the quantized signal using the symbol decisions, and output the filtered quantized signal.

9. The receiver of claim 8, wherein the equalizer further includes:
    a delay device configured to delay the soft information signal by a symbol interval corresponding to a multiple of D;
    wherein D is a quantity of delay of the decoder,
    wherein the second filter delays the quantized signal by D, and
    wherein the second filter filters the delayed quantized signal.

10. A method for equalizing an input signal, the method comprising:
    decoding an equalized signal to generate symbol decisions and a soft information signal;
    quantizing the equalized signal in response to uniform and non-uniform boundary levels selected using the soft information signal;
    filtering the input signal; and
    equalizing the filtered input signal based on the quantized signal and the symbol decisions;
    wherein the soft information signal is represented by:

$$\alpha = (1/PM_{00} + 1/PM_{10}) - (1/PM_{01} + 1/PM_{11})$$

wherein $\alpha$ is the soft information signal,
    wherein $PM_{00}$ is a path metric value of a path through which the equalized signal may be merged into a state 00,
    wherein $PM_{01}$ is a path metric value of a path through which the equalized signal may be merged into a state 01,
    wherein $PM_{10}$ is a path metric value of a path through which the equalized signal may be merged into a state 10, and
    wherein $PM_{11}$ is a path metric value of a path through which the equalized signal may be merged into a state 11.

11. The method of claim 10, further comprising:
    filtering the quantized signal using the symbol decisions; and
    adding the filtered quantized signal and the filtered input signal to generate the equalized signal.

12. The method of claim 10, wherein the decoding is trellis-coded modulation (TCM) decoding.

13. The method of claim 10, wherein the symbol decisions are decided from a sequence of a most probable surviving path having a smallest path metric value among a plurality of surviving paths.

14. The method of claim 10, wherein the soft information signal indicates whether a next value of a received vestigial side-band (VSB) signal is closer to a first data subset or a second data subset.

15. The method of claim 14, wherein the first data subset includes levels −7, −3, +1 and +5 among eight levels, and
    wherein the second data subset includes levels −5, −1, +3 and +7 among the eight levels.

16. The method of claim 10, wherein decoding an equalized signal includes:
- trellis-coded modulation (TCM) decoding respective symbols having equal symbol intervals from the equalized signal to generate respective decisions and additional information signals;
- sequentially selecting the generated additional information signals and outputting a selected additional information signal as the soft information signal; and
- sequentially selecting the generated decisions and outputting the selected decisions as the symbol decisions.

17. The method of claim 16, wherein adjacent decisions have an interval of a plurality of symbols between the adjacent decisions.

18. The method of claim 11, wherein the boundary levels belong to one of a plurality of decision boundary sets.

19. The method of claim 11, further comprising:
- delaying the soft information signal by a symbol interval corresponding to a multiple of D;
- delaying the quantized signal by D; and
- filtering the delayed quantized signal;
- wherein D is a quantity of delay.

20. A receiver, comprising:
- a decoder configured to decode a plurality of symbols, symbol decisions, and additional information signals from an equalized signal, sequentially select one of the additional information signals, and output a selected additional information signal as a soft information signal; and
- an equalizer configured to quantize the equalized signal in response to boundary levels selected using the soft information signal, filter the quantized signal using the symbol decisions, and add the filtered quantized signal and a filtered input signal to generate the equalized signal;
- wherein the soft information signal is represented by:

$$\alpha = (1/PM_{00} + 1/PM_{10}) - (1/PM_{01} + 1/PM_{11})$$

wherein $\alpha$ is the soft information signal, wherein $PM_{00}$ is a path metric value of a path through which the equalized signal may be merged into a state 00, wherein $PM_{01}$ is a path metric value of a path through which the equalized signal may be merged into a state 01, wherein $PM_{10}$ is a path metric value of a path through which the equalized signal may be merged into a state 10, and wherein $PM_{11}$ is a path metric value of a path through which the equalized signal may be merged into a state 11.

* * * * *